June 10, 1930.　W. J. HOGG　1,762,988
THREADING DIE OPERATING ATTACHMENT
Filed Feb. 15, 1928　3 Sheets-Sheet 1

Inventor
William J. Hogg
by his Attorney

June 10, 1930.　　　W. J. HOGG　　　1,762,988
THREADING DIE OPERATING ATTACHMENT
Filed Feb. 15, 1928　　3 Sheets-Sheet 2

Inventor
William J. Hogg
by his Attorney

June 10, 1930.  W. J. HOGG  1,762,988
THREADING DIE OPERATING ATTACHMENT
Filed Feb. 15, 1928   3 Sheets-Sheet 3
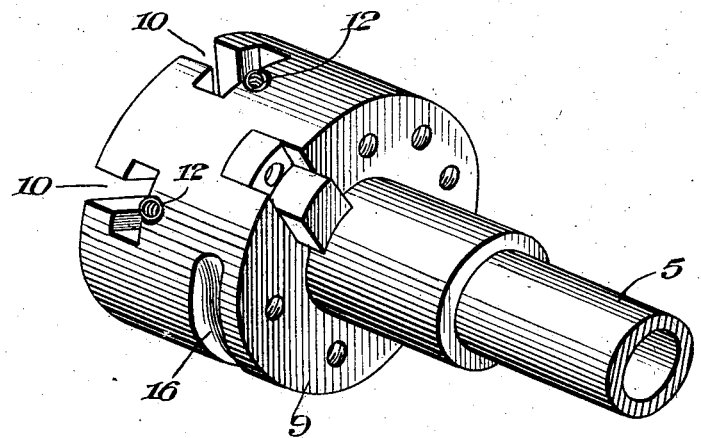
Fig. 7.
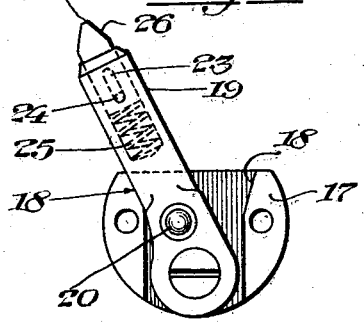
Fig. 8.
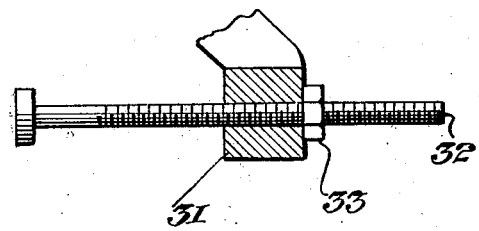
Fig. 11.
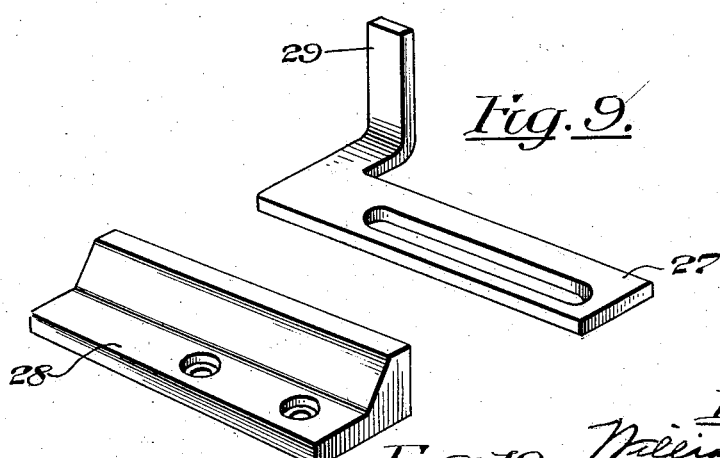
Fig. 9.
Fig. 10.
Inventor
William J. Hogg
by his Attorney Patented June 10, 1930

1,762,988

UNITED STATES PATENT OFFICE

WILLIAM J. HOGG, OF CLEVELAND, OHIO, ASSIGNOR TO THE NATIONAL ACME COMPANY, OF CLEVELAND, OHIO, A CORPORATION OF OHIO

THREADING-DIE-OPERATING ATTACHMENT

Application filed February 15, 1928. Serial No. 254,358.

This invention relates to a threading die operating attachment, an object of the invention being to provide improved means for automatically closing the cutters or chasers of a threading die, the attachment being particularly adapted for use on what is known as a Brown & Sharpe automatic screw machine.

A further object of the invention is the provision of means whereby a self-opening threading die, such as those manufactured by The National Acme Company and known as "Namco" threading dies, can be automatically closed just before the die starts threading, thereby eliminating the possibility of the die being snapped open by the sudden indexing of the tool turret of the machine, and which means is simple in construction, efficient and positive in operation, inexpensive to manufacture and can be readily applied to screw machines of the type described, thereby materially facilitating the use of threading dies of this type.

In the Brown & Sharpe automatic screw machine, a single rotatable work spindle is provided, and a sliding, horizontally-supported, indexible tool turret is shifted toward and from this work spindle and is indexed to carry the several tools mounted in the turret in position successively to work upon the work carried by the work spindle. Frequently one of these tools is a threading die, the chasers or cutters of which have heretofore been closed or collapsed in readiness to thread a piece of work during the indexing of the turret and before the die reaches its threading position, with the result that the sudden jarring incidental to the indexing of the turret not infrequently snapped open the cutters or chasers, so that when the die reaches its threading position the chasers are in their open position instead of being closed and this resulted in a number of unthreaded pieces. In other words, due to the failure of the die to remain closed during the indexing of the turret, it performs no work until the cutters have been closed again and the die again indexed into position in juxtaposition to the work. This resulted in a considerable loss of time and work.

In the present improvement, the construction is such that the chasers or cutters are not closed until the threading die has been indexed into its proper position in alignment with the work and is traveling toward that work, so that when once the chasers are closed they remain closed and will efficiently perform the work for which the die is designed, since there is no further indexing of the turret until after the piece has been threaded.

In the drawings accompanying and forming part of this specification—

Fig. 7 is a perspective view of the die body with its cap and chasers removed;

Fig. 8 is a view of the cutter operating means detached from the die;

Figs. 9 and 10 are perspective views of the means for actuating the cutter operating means;

Fig. 11 is a detail view of the stop for limiting the forward movements of the tool turret.

Similar characters of reference indicate corresponding parts in the several views.

Figure 1:
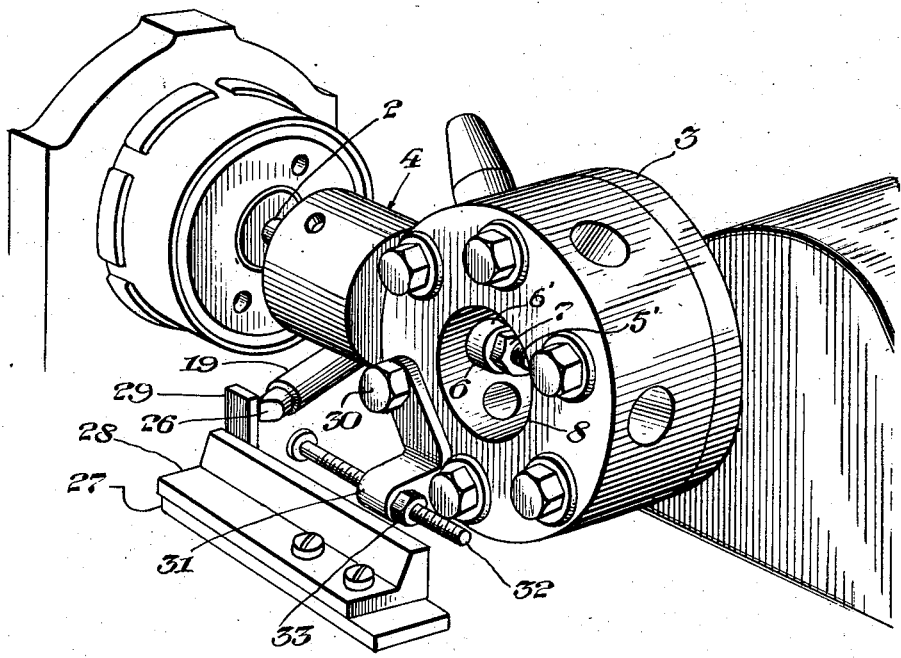
Figure 1 is a perspective view illustrating so much of a Brown & Sharpe automatic screw machine as is believed necessary properly to show this improved threading die operating means, this view illustrating the die with the cutters closed in readiness to thread the piece.
Figure 2:
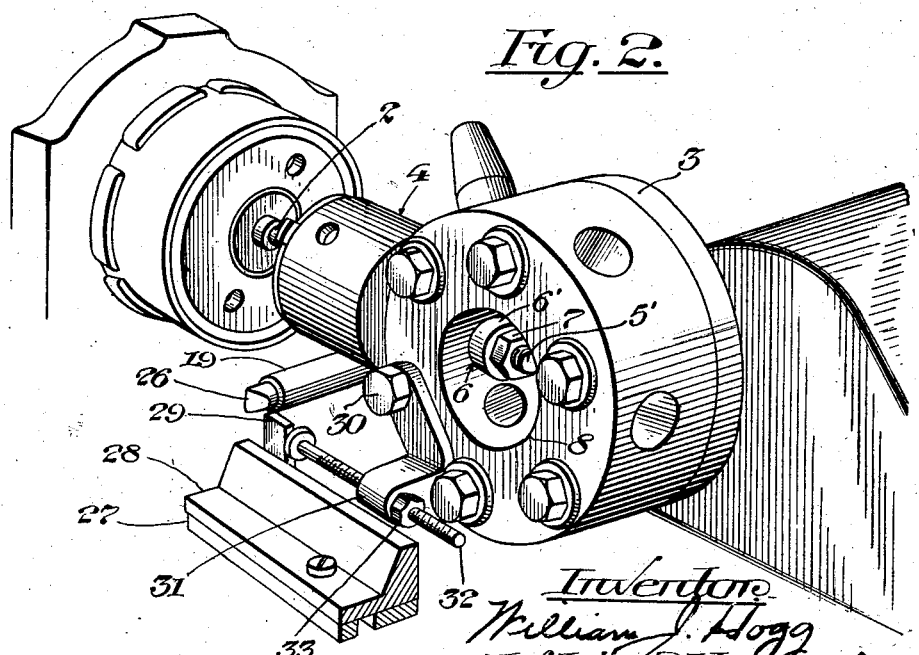
Fig. 2 is a similar view, in which, however, the work has been threaded, the cutters have been opened and the tool slide and the die are in readiness to return or move away from the work.
Figure 4:
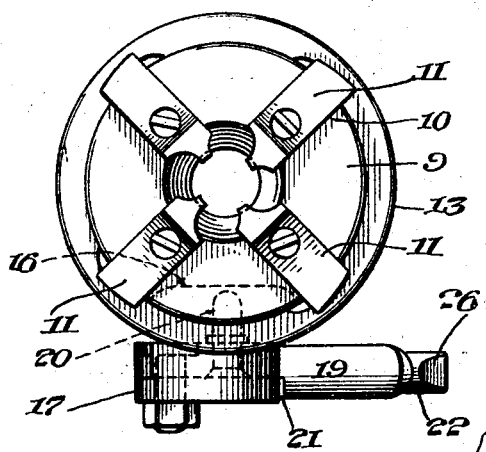
Fig. 4 is a front view of the die shown in Fig. 3.
Figure 5:
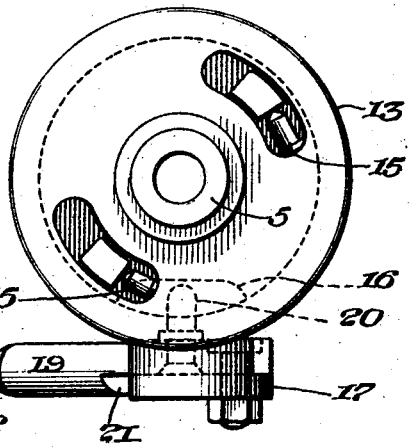
Fig. 5 is a rear view of the die.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

A Brown & Sharpe automatic screw machine has a single rotating work spindle, such as 2. In the front thereof, and slidingly supported for movement toward and from this work spindle, is a horizontally-supported tool turret 3 provided with means for attaching thereto a series of tools, and this turret is suitably indexed, by means which it is not necessary to show, to carry each tool successively into position to perform its work on the work carried by the work spindle. This work spindle is rotated by suitable means not deemed necessary to show.

It is the practice, when necessary to thread a piece of work, to mount on the tool turret a threading die, the chasers or cutters of which, when a "Namco" die is used, are automatically opened by the work drawing these cutters or chasers out of the casing or cap, whereupon it is necessary to automatically close these chasers in readiness for the next piece of work, and these chasers or cutters have been automatically closed heretofore on this class of machines during the indexing of the turret to carry other tools into position to operate upon the work, but during the succeeding indexing of the turret, due to the jar and other causes, the chasers not infrequently snap open with the result that, when the die is brought into position to thread its piece of work, this is not done and consequently considerable time is lost in the operation of the machine.

In the present instance, a "Namco" threading die 4 is shown mounted on the tool turret, the shank 5 of this die passing through an opening 6 in the turret and being secured to the turret by a suitable hex screw or bolt 30 which also serves to hold the stop hereinafter described in position. The turret is provided with an enlarged bore 8 whereby access to the inner end of the die shank is made possible. This threading die is substantially similar to that shown and described in the contemporaneously-pending application owned by The National Acme Company, Serial No. 155,374, filed December 17, 1926, and only a brief description thereof is, therefore, deemed necessary.

This die comprises a body 9 secured to the shank 5 and is provided with a series of radially-located slots 10 for the reception of the cutters or chasers 11 which are shifted outwardly by suitable springs 12, the chasers or cutters being closed or collapsed when the body is forced into the closing cap 13 by means of the cam faces 14 carried by the chasers. Suitable adjusting means 15 is provided for setting the chasers to cut the desired thread.

Figures 3, 6, 12:
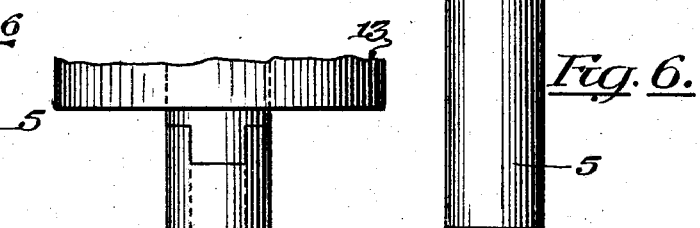
Fig. 3 is a side view of the threading die with the cutter operating member attached thereto, the cutters being shown opened.
Fig. 6 is a side view of the die body with the cap thereof in section and taken on line 6—6, Fig. 3.
Fig. 12 illustrates a special form of die shank.

It is at times desirable to provide the die with a special form of shank, see Fig. 12, in which the shank comprises a threaded end 5' mounted in a bushing 6' recessed or bored to provide a pair of shoulders and in this recess is located a coil spring 5'' engaging one of the shoulders of the bushing for holding the bushing in place on the threaded end of the shank of the die. A nut 7 is carried on the threaded end of the shank adjacent to the other shoulder of the bushing for compressing the spring and thereby adjust the amount of float the die is to have. This construction is used when the travel of the tool turret 3 of a Brown and Sharpe machine is slower than the lead of the thread being cut and allows the die head to move forward ahead of the travel of the turret, the adjusting nut 7 being effective to adjust or set the amount of float required. If no float is required the nut is then tightened against the shoulder of the bushing.

The construction of the die is such that, when the die has properly performed its work, the advance of the tool turret is stopped and the further forward movement of the body of the die relatively to the cap thereof, which is obtained by the work drawing the die body, pulls the chasers forward, free of the cap, whereupon the springs open the chasers and release the work, at which time the die, together with the turret, recedes from the work. Therefore, it is necessary to again close the die in readiness to perform its next threading operation. This, as hereinbefore stated, on the Brown & Sharpe machine has been done during the indexing of the turret and before the threading die is in position to be advanced to the work and, consequently, at times the chasers have snapped open, so that the die did not perform its proper work.

In the present improved die, the body 9 is provided with a circumferential, peripheral slot 16 in juxtaposition to which the cap 13 of the die is provided with an opening 16' and secured to the cap is a recessed plate 17 having inclined end walls 18. In the recess of this plate is pivoted an actuating arm 19 provided with an eccentrically-mounted, transverse pin 20 projecting through the opening 16' of the cap and into the circumferential slot 16 of the body. When this arm or lever 19 is moved in one direction, the pin 20 thereof projecting into the circumferential slot of the body forces the body into the cap and thereby closes or collapses the chasers, and when the chasers are pulled forward by the work, the actuating arm is shifted into an opposite position by the forward movement of the die body. The forward and rearward movements of the actuating arm are limited by stop faces 21 formed on the arm 19 by suitably recessing it. This actuating arm is provided with a shiftable end, and in the form shown the arm is preferably of tubular or sleeve form at its outer end, and located therein is a spring-actuated sliding bolt 22. This bolt is slotted, as at 23, and into the slot thereof a pin 24, carried by the tubular arm, projects, thereby limiting the movement of the bolt, and in the rear of this bolt is located a spring 25 for pushing it forward. The end of this bolt is beveled, as at 26, on its opposite faces.

Carried by the framework or bed of the machine is a slotted plate 27, whereby it may be adjusted endwise. This plate is secured in position by means of a suitable angle clamping plate 28 bolted to the bed. The plate 27 is provided with an upstanding arm or projection 29 in position to engage the actuating arm 19 of the die. When the tool turret has indexed the die into position in alignment with the work and moves forward toward the work, the beveled end of the actuating arm 19 strikes this projection 29 of the plate, whereupon the actuating arm is thrown to the rear of the die, thereby shifting the body of the die into its cap and closing the chasers in readiness to perform their work. After the work has been threaded and the chasers have been opened in the manner hereinbefore stated, the turret and the die recede from the work, at which time, the actuating arm 19 having been shifted by the opening of the chasers, it is necessary that this actuating arm pass the projection 29 of the plate and this is permitted by the shiftable member or bolt 22 of the actuating arm, the opposite beveled face of which strikes the projection 29 and so forces the bolt in against the action of its spring, thereby permitting the actuating arm to pass. The bevel at this side of the bolt is somewhat greater than that at the opposite side.

Thus the chasers can remain open during the entire indexing of the turret and until the die is again in line with the work to be threaded and is moved forward by the advance of the turret, whereupon they are closed in the manner just described. Consequently, there is nothing to interfere with the proper operation of the die, since the indexing has been completed and, therefore, there is nothing to snap the chasers open prematurely. Clamped to the turret by the bolt 30 which as hereinbefore stated also holds the die in the turret is a stop device comprising an angle bracket 31 carrying an adjustable threaded rod 32 and a lock nut 33. The front end of stop rod 32 is in position to engage the fixed projection 29, when the tool slide reaches a certain position, thereby preventing further forward movement of the tool slide, at which time the further forward movement of the die body, by reason of its engagement with the work, pulls the same out of its cap or casing, thereby permitting the chasers to be opened to release the work.

The parts of this improved attachment are so constructed that they can be used when the threading machine is set up with the slotting attachment and will not interfere therewith.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim;

1. A threading die comprising a closing cap, a chaser-carrying body shiftable in said cap, means for shifting the body relatively to the cap and comprising a shiftable arm having means engaging the body to shift the body, and shiftable means located adjacent to the outer end of said arm and automatically shiftable relatively to the arm to permit said arm to pass an obstruction in the path thereof.

2. A threading die comprising a closing cap, a chaser-carrying body shiftable in said cap, means for shifting the body relatively to the cap and comprising a shiftable arm located tangentially to the cap and having means engaging the body for shifting it, and a member carried by and shiftable relatively to said arm and automatically shiftable relatively to the arm to permit said arm to pass an obstruction in the path thereof.

3. A threading die comprising a closing cap, a chaser-carrying body shiftable in said cap, means for shifting the body relatively to the cap and comprising a shiftable arm and having means engaging the body for shifting it, and a spring-actuated bolt carried by said arm and automatically shiftable relatively to the arm to permit said arm to pass an obstruction in the path thereof.

4. A threading die comprising a closing cap, a chaser-carrying body shiftable in said cap, and means for shifting the body relatively to the cap and comprising a pivoted arm supported on and located tangentially to the cap and having an eccentrically located pin engaging the body for shifting it.

5. A threading die comprising a closing cap, a chaser-carrying body shiftable in said cap, and means for shifting the body relatively to the cap and comprising a recessed plate secured to the body, an arm pivoted interiorly thereof and located tangentially to the cap and having a pin engaging the body for shifting it.

6. A threading die comprising a closing cap, a chaser-carrying body shiftable in said cap and having a floating shank, means for shifting the body relatively to the cap and comprising a shiftable arm in engagement with the body and shiftable means located at the outer end of said arm and automatically shiftable relatively to the arm to permit said arm to pass an obstruction in the path thereof.

7. A threading die comprising a closing cap, a chaser-carrying body shiftable in said cap and having a floating shank, means for shifting the body relatively to the cap and comprising a shiftable arm located tangentially to the cap and having means engaging the body and shiftable means located at the outer end of said arm and automatically shiftable relatively to the arm to permit said arm to pass an obstruction in the path thereof.

8. A threaded die comprising a closing cap, a chaser-carrying body shiftable in said cap, and means for shifting the body relatively to the cap and comprising a pivoted arm supported on the cap and having a transverse pin projecting through the cap and into the body whereby on the shifting of the arm the chasers will be closed.

9. A threading die comprising a closing cap, a chaser-carrying body shiftable in said cap, means for shifting the body relatively to the cap and comprising a pivoted arm supported on the cap and having a transverse pin projecting through the cap and into the body whereby on the shifting of the arm the chasers will be closed, and shiftable means carried by the arm for permitting the passage of the arm in one direction without effecting the position of said arm.

10. The combination of a threading die adapted to be carried by an indexible and sliding tool turret and comprising a closing cap, a chaser-carrying body shiftable in said cap, means for shifting the body relatively to the cap and comprising a shiftable arm supported on and located tangentially to the cap and having means engaging the body, and fixed means for engaging the arm thereby to shift it to close the chasers.

11. The combination of a threading die adapted to be carried by an indexible and sliding tool turret and comprising a closing cap, a chaser-carrying body shiftable in said cap, means for shifting the body relatively to the cap and comprising a shiftable arm supported on and located tangentially to the cap and having means engaging the body, fixed means for engaging the arm thereby to shift it to close the chasers, and shiftable means carried by the arm and effective to permit the passage of the arm by said fixed means in one direction without effecting the position of said arm.

12. The combination of a threading die adapted to be carried by an indexible and sliding tool turret and comprising a closing cap, a chaser-carrying body shiftable in said cap, means for shifting the body relatively to the cap and comprising a shiftable arm supported on and located tangentially to the cap and having means engaging the body, fixed means for engaging the arm thereby to shift it to close the chasers, shiftable means carried by the arm and effective to permit the passage of the arm by said fixed means in one direction without effecting the position of said arm, and stop means shiftable with the turret for limiting the forward movement of the threading die.

13. In an automatic screw machine having a rotatable spindle and an indexible and slideable tool turret, the combination of a threading die supported by the turret and comprising a closing cap, a chaser-carrying body shiftable in said cap, means for shifting the body relatively to the cap, and comprising a pivoted arm supported on and located tangentially to the cap and having a transverse pin engaging the body, and fixed means for actuating said arm in one direction.

14. In an automatic screw machine having a rotatable spindle and an indexible and slideable tool turret, the combination of a threading die supported by the turret and comprising a closing cap, a chaser-carrying body shiftable in said cap, means for shifting the body relatively to the cap, and comprising a pivoted arm supported on and located tangentially to the cap and having a transverse pin engaging the body, and fixed means for actuating said arm in one direction, said arm having means shiftable relatively thereto for permitting the passage of the arm by said fixed means in one direction.

15. In an automatic screw machine having a rotatable spindle and an indexible and slideable tool turret, the combination of a threading die supported by the turret and comprising a closing cap, a chaser-carrying body shiftable in said cap, means for shifting the body relatively to the cap, and comprising a pivoted arm supported on and located tangentially to the cap and having a transverse pin engaging the body, and adjustable fixed means for actuating said arm in one direction, said arm having means shiftable relatively thereto for permitting the passage of the arm by said fixed means in one direction.

16. In an automatic screw machine having a rotatable spindle and an indexible and slideable tool turret, the combination of a threading die supported by the turret and comprising a closing cap, a chaser-carrying body shiftable in said cap, means for shifting the body relatively to the cap, and comprising a pivoted arm supported on and located tangentially to the cap and having an eccentrically located transverse pin engaging the body, and fixed means for actuating said arm in one direction.

17. In an automatic screw machine having a rotatable spindle and a slideable and indexible turret, the combination of a threading die carried by the turret and comprising a closing cap, a shiftable chaser-carrying body therein, a shiftable actuating arm provided with means for engaging the body, fixed means in position to shift said arm and thereby the body to close the chasers of the die, and stop means carried by the turret for engaging said fixed means to limit the forward movement of the turret.

18. The combination of a threading die adapted to be carried by a sliding turret and comprising a closing cap and a chaser-carrying body in said cap shiftable relatively to each other, means for shifting the shiftable member and comprising shiftable means located exteriorly and tangentially of the cap and in engagement with the shiftable member, and fixed means for engaging said shiftable means on the sliding movement of the turret.

19. The combination of a threading die adapted to be carried by a sliding turret and comprising a closing cap and a chaser-carrying body in said cap shiftable relatively to each other, means for shifting the shiftable member and comprising shiftable means located exteriorly of the cap and in engagement with the shiftable member, and fixed means for engaging said shiftable means on the sliding movement of the turret.

20. The combination of a threading die adapted to be carried by a sliding turret and comprising a closing cap and a chaser-carrying body in said cap shiftable relatively to each other, means for shifting the shiftable member and comprising shiftable means located exteriorly of the cap and in engagement with the shiftable member, and fixed means for engaging said shiftable means on the sliding movement of the turret, said shiftable means having means shiftable relatively thereto for permitting the passage of the shiftable means by said fixed means in one direction.

21. In a screw machine, the combination of a threading die comprising a closing cap and a chaser-carrying body, one shiftable relatively to the other for closing the chasers, means for shifting the shiftable member thereby to close the chasers and comprising a shiftable means located exteriorly of the cap, and means for engaging and automatically shifting said shiftable means.

22. In screw machine, the combination of a threading die comprising a fixed closing cap and a shiftable chaser-carrying body, said body shiftable relatively to the cap for closing the chasers, means for shifting the body thereby to close the chasers and comprising a shiftable means located exteriorly of the cap, and means for engaging and automatically shifting said shiftable means.

23. In an automatic screw machine having a rotatable spindle and an indexible and slideable tool turret, the combination of a threading die supported by the turret and comprising a closing cap, a chaser-carrying body, means for shifting one of said parts relatively to the other thereby to close the chasers and comprising a shiftable means located exteriorly of the cap, and fixed means for engaging and automatically shifting said shiftable means subsequent to the indexing of the turret and the threading die and during the forward sliding movement of the turret thereby to close the chasers.

24. In an automatic screw machine having a rotatable spindle and an indexible and slideable tool turret, the combination of a threading die carried by the turret and comprising a fixed closing cap and a shiftable, chaser-carrying body for closing the chasers, means for shifting the body thereby to close the chasers and comprising a shiftable means located exteriorly of the cap, and fixed means for engaging and automatically shifting said shiftable means subsequent to the indexing of the turret and the threading die and during the forward sliding movement of the turret thereby to close the chasers.

Signed at Cleveland, Ohio, this 10th day of February, 1928.

WILLIAM J. HOGG.